UNITED STATES PATENT OFFICE.

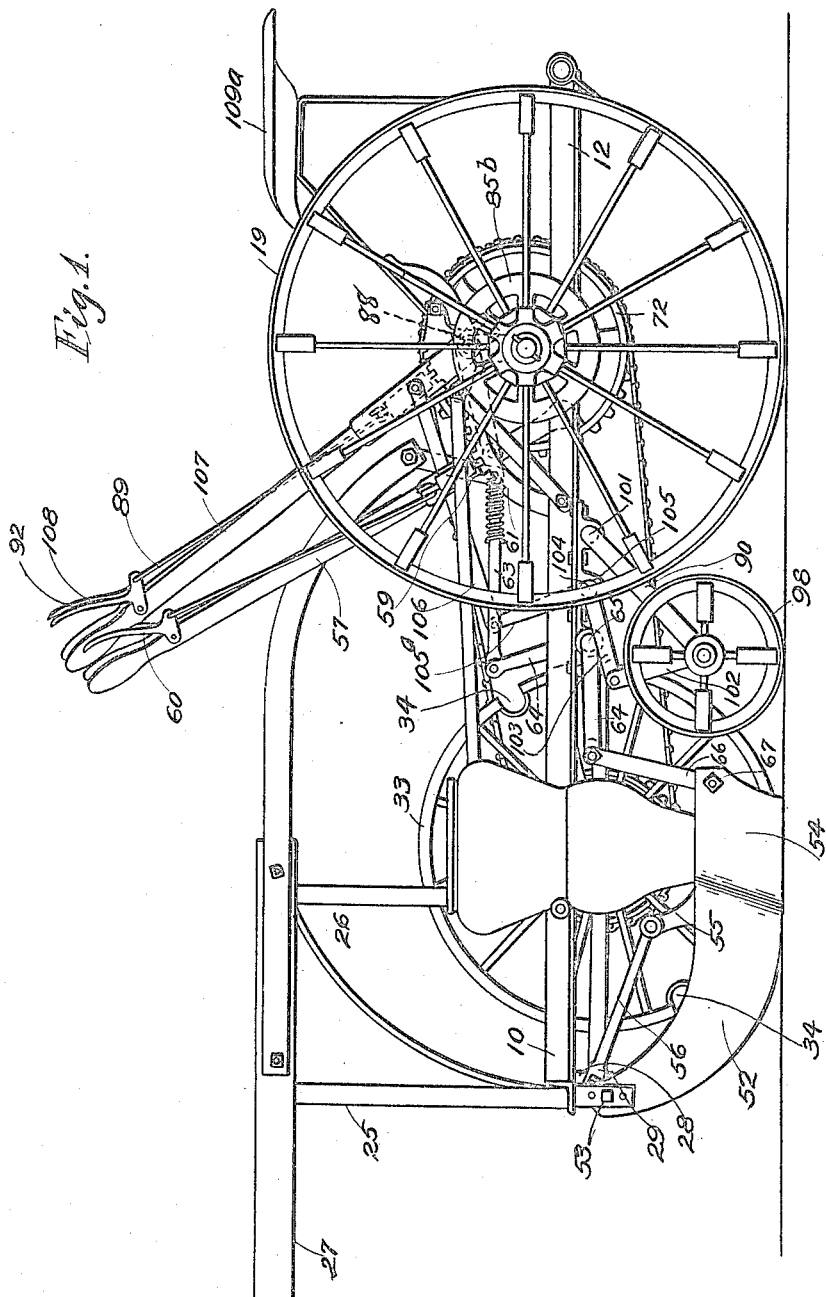

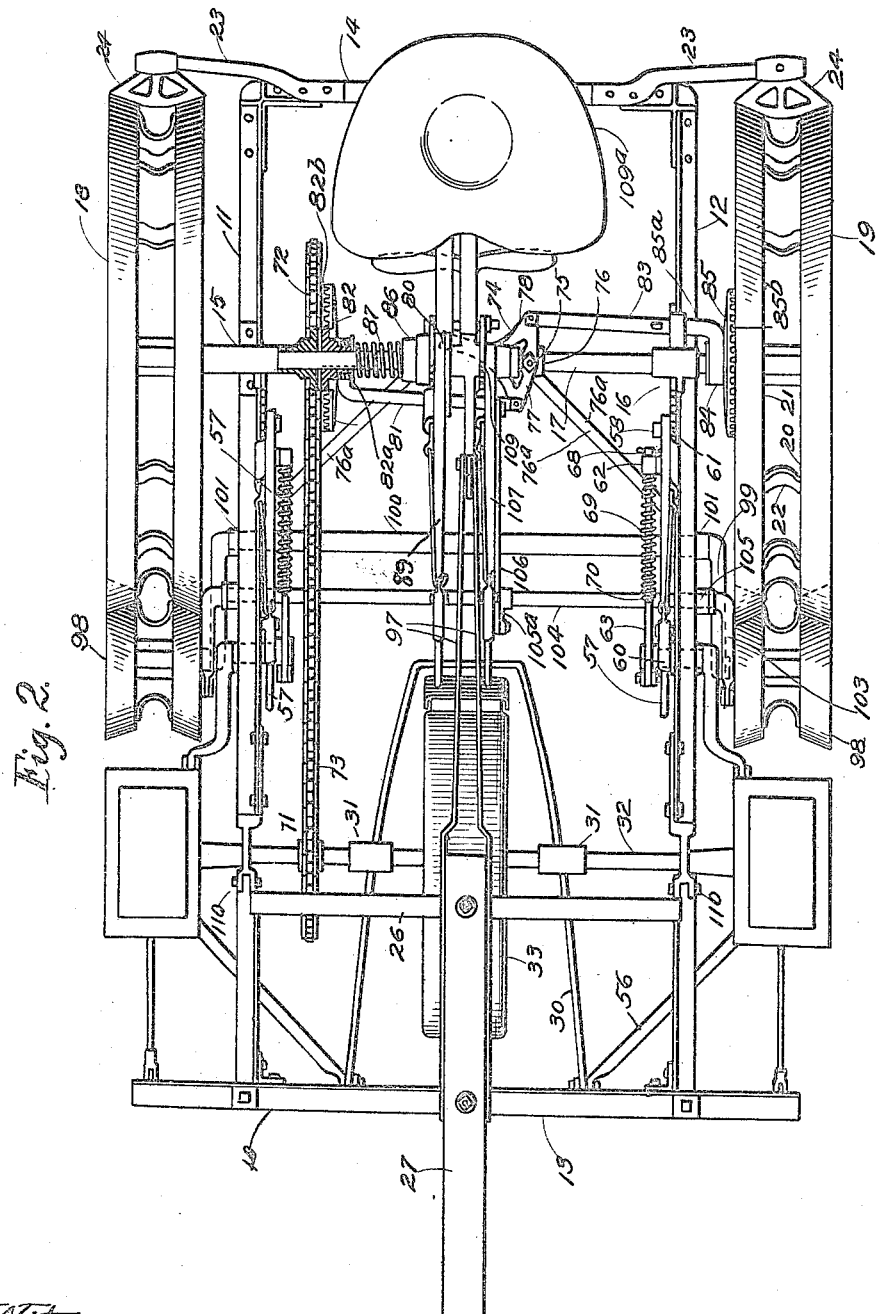

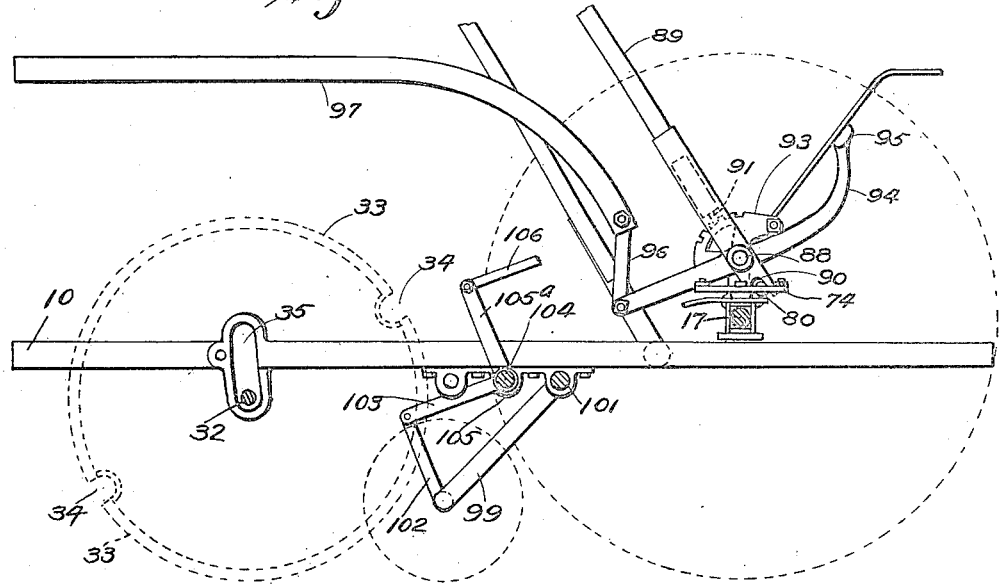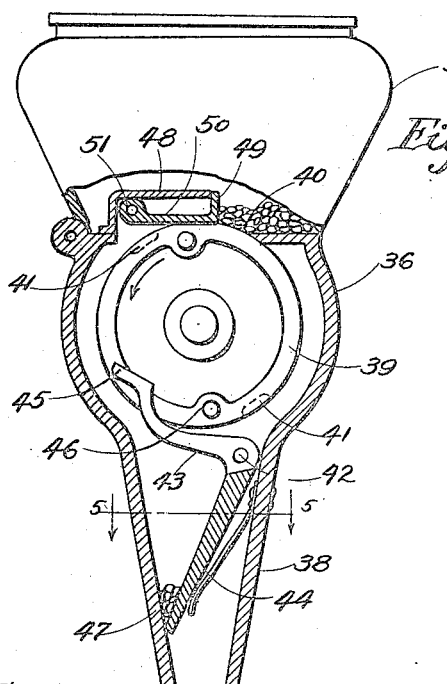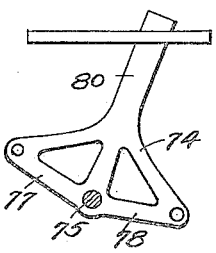

COLONEL W. LANHAM, OF JOLIET, ILLINOIS, ASSIGNOR, BY MESNE ASSIGNMENTS, TO BRADY WIRELESS CORN PLANTER COMPANY, OF CHICAGO, ILLINOIS, A CORPORATION OF DELAWARE.

CORN-PLANTER.

1,253,694.   Specification of Letters Patent.   Patented Jan. 15, 1918.

Application filed February 21, 1914. Serial No. 820,370

*To all whom it may concern:*

Be it known that I, COLONEL WOLFORD LANHAM, a citizen of the United States, residing at Joliet, in the county of Will and State of Illinois, have invented certain new and useful Improvements in Corn-Planters, of which the following is a specification.

My invention relates to corn planters and its purpose is to provide improvements over the structures embodied in my prior Patents Nos. 812,755 and 939,717.

In the construction of a corn planter it is very desirable that some means be provided whereby the corn will be dropped in hills at fixed intervals and whereby the hills of adjacent rows will aline with each other so that the hills of corn will lie in rows both longitudinally and transversely of the field in order that the corn may be cultivated between the hills in both directions.

The principal object of my invention is to provide improved means for automatically planting corn so that the hills of corn will with substantial certainty lie in rows both longitudinally and transversely of the field. Other objects will be set forth and made apparent in the following specification, taken in connection with the accompanying drawings, in which—

Figure 1 is a side elevation of my improved corn planter.

Fig. 2 is a top plan view partially in section of the same.

Fig. 3 is a partial side elevation of certain parts of the operating mechanism.

Fig. 4 is a side elevation partly in section of the corn hopper and associated parts.

Fig. 5 is a sectional view taken on the line 5, 5 of Fig. 4; and

Fig. 6 is a detail view of the clutch operating lever.

Referring to the drawings, the main frame of my improved corn planter, designated generally by the numeral 10, comprises the side frame members 11 and 12 and the front and rear cross frame members 13 and 14, respectively, said frame members being rigidly connected at their meeting points. Relatively near the rear end of said side frame members 11 and 12 are secured bearings 15 and 16 in which the shaft 17 is journaled. The shaft 17 has non-rotatively mounted thereon at one end the covering and supporting wheel 18 and rotatively mounted thereon at the other end thereof the covering and supporting wheel 19. Each of the wheels 18 and 19 has a rim made in two parts 20 and 21, which are joined by U-shaped brackets 22. These parts are of such form that the outer periphery of each wheel presents an inwardly concaved surface for a purpose to be hereinafter set forth.

Near the front end of the frame 10 and rigidly secured thereto are the arch supporting members 25 and 26 having rigidly secured thereto the tongue 27 by means of which the planter is drawn across the field. It is apparent that the tongue 27 and the wheels 18 and 19 serve as supports for the frame of the planter and parts carried thereby.

The front cross member 13 of the frame 10 has secured thereto and depending therefrom the plates 28 which have pivoted thereto at the points 29 the ends of a substantially U-shaped sub-frame 30 having fixed thereon the bearings 31 in which are journaled the shaft 32 of a marker wheel 33. The marker wheel 33 is fixed on the shaft 32 and has a wide rim whose outer flat surface is provided at diametrically opposite points with depressions 34 which are parallel with the shaft 32. As the planter is drawn across the field the marker wheel 33 coacts with the soft earth and the depressions 34 serve to leave ridges on the surface of the ground at fixed intervals in the path of the wheel.

The side frame members 11 and 12 are provided with oblong slots 35 which serve as limiting guides for the shaft 32 and within which said shaft may be made to oscillate in a substantially vertical plane. The outer ends of the shaft 32 terminate in housings 36 comprising corn hoppers 37 above the shaft and outlet ducts 38 below the shaft. The outlet ducts 38 are substantially rectangular in cross section, as shown in Fig. 5.

Fixed on each end of the shaft 32 within each housing 36 is a dropper disk 39, adjacent the upper peripheral surface of which is an outlet passage 40 leading from the hopper 37. The disk 39 is provided on its peripheral surface at diametrically opposite points with recesses or cups 41, which are adapted to receive charges of corn from the hopper 37 as they pass by the outlet passage 40. Pivoted below the dropper disk 39 at the point 42 is a latch member 43 having a lower depending arm 44 adapted to fit the outlet duct 38, as shown in Fig. 5. The upper arm of the latch member 43 is provided with a lug 45 which lies in the circular path of the dogs 46, which are fixed at diametrically opposite points on the end face of the dropper disk 39. The dogs 46 are in substantially the same plane with the depressions 34 in the rim of the marker wheel 33. The parts of the latch member are so arranged that said latch member normally occupies the position shown in Fig. 4 and the charge of corn which drops from a recess 41 as the disk 39 rotates will fall down and be retained at the point 47 by the arm 44 until the next following dog 46 strikes the lug 45. At this point the latch member is actuated and the charge of corn is dropped through the outlet duct to the ground simultaneously with the marking of the ground between the rows by the depressions 34 in the marker wheel 33.

In the lower part of the hopper 37 adjacent the outlet passage 40 is a small housing 48 having an opening adjacent the outlet passage 40, which is closed by the upturned portion 49 of a plate 50 which is pivoted to the housing 48 at the point 51. The lower surface of the plate 50 bears on the upper peripheral surface of the disk 39 and oscillates freely so that if kernels of corn are drawn between the flat peripheral surface of the disk 39 and the plate 50, the plate 50 will swing upwardly about its pivot 51 and all danger of clogging of the parts of the device will be avoided.

Beneath each housing 36 is a furrow opener 52 pivoted at point 53 to the front cross arm 13 of the frame and provided adjacent the rear portion thereof with two diverging plates 54 which pass on either side of the outlet duct 38. An arm 55 is fixed to the furrow opener adjacent the housing 36 and has pivoted thereto an arm 56 whose other end is pivoted to the plate 28 at the point 29. These arms 56 serve to prevent lateral swaying of the furrow openers and at the same time permit an upward and a downward movement thereof. The furrow openers 52 make a furrow ahead of the corn dropping mechanism into which the corn is dropped at fixed intervals by the mechanism heretofore described. The covering and supporting wheels 18 and 19 then follow in the path of the furrow openers, and owing to the inwardly concaved rims of those wheels the earth is forced inwardly toward the center of the furrow and the corn is covered. Each furrow opener 52 can be independently adjusted to vary the depth of the furrow by means of the levers 57 which are located one at each side of the machine adjacent the main shaft 17. The lever 57 is pivoted at the point 58 to the frame of the machine and has a spring actuated tooth 59 which may be operated by the hand latch 60 to engage one of the notches in the notched quadrant 61, which is also fixed on the frame.

At a point adjacent its lower end the lever 57 carries a pivoted sleeve 62 in which is journaled a link 63 having its other end pivoted to the bell crank lever 64. The bell crank lever 64 is journaled in the side frame at 65 and its lower arm is connected by means of the link 66 to the rear end of the furrow opener 52 at the point 67. The link 63 has a pin 68 inserted therethrough which prevents said link from sliding out of the sleeve 62 and enables the operator to elevate the furrow opener 52 by moving the lever 57 in an upward and backward direction. A spring 69 is mounted on the link 63 and has one end abutting against the sleeve 62 and the other end abutting against the pin inserted through the link 63 at the point 70. These springs provide a certain flexibility in the adjustment of the furrow openers 52 so that if a furrow opener strikes a stone or other hard obstacle in its path, the spring 69 will be compressed, the link 63 sliding in the sleeve 62, thereby permitting a slight upward movement of the furrow opener 52 and avoiding danger of injury to the parts of the structure.

Keyed on the marker shaft 32 is a sprocket wheel 71 and rotatably mounted in alinement therewith on the main shaft 17 is a second sprocket wheel 72. An endless sprocket chain 73 operatively connects these sprocket wheels. Carried on the main shaft 17 is a clutch mechanism comprising the clutch lever 74, pivoted at point 75 on the sleeve 76 carried by the shaft 17, having oppositely disposed arms 77 and 78 and an operating arm 80 at right-angles thereto. The sleeve 76 is maintained loosely but non-rotatively on the shaft 17 by means of the braces 76$^a$ which are fixed at their ends to said sleeve and to the frame of the machine. Pivoted to the end of the forward arm 77 of said clutch lever 74 is a link 81 which has its other end inturned and journaled on the hub of the clutch sleeve 82, where it is held in position by the annular shoulder 82$^a$. The clutch sleeve 82 is slidably but non-rotatively mounted on the shaft 17 and is provided on its outer face with beveled teeth adapted to mesh with the toothed wheel 82$^b$ fixed to the sprocket wheel 72. At the outer end of the arm 78 of the clutch lever 74 is a link 83 whose outer end carries a sleeve 84 which is journaled on the hub of the clutch sleeve 85 keyed in slidable position on the shaft 17. The clutch sleeve 85 is provided on its outer face with beveled teeth adapted to mesh with teeth carried by a wheel 85$^b$ fixed on the covering wheel 19 and the hub of said sleeve is provided with the annular shoulder 85ª against which the sleeve 84 abuts when the sleeve is withdrawn into inoperative position.

Between the clutch sleeve 82 and the sleeve 76 carried by the shaft 17 is a coil spring 87 which operates to normally force the clutch sleeves outwardly and into engagement with the gear wheels carried by the sprocket wheel 72 and the covering wheel 19. Pivoted on a shaft 88 carried in fixed position above the sleeve 76 is a lever 89 whose lower end below the shaft 88 is provided with a slot 90 which engages the operating arm 80 of the clutch lever 74. The lever 89 carries a spring actuated tooth 91 which may be operated by the hand latch 92 to engage one of the notches in the notched quadrant 93 fixed on the sleeve 76.

Rigidly connected with the lever 89 on the shaft 88 is a foot lever 94 having the arms 95 adapted to be engaged by the feet of the operator, and pivoted at its other end to the link 96. The other end of the link 96 is pivoted to the two arms 97 which are affixed at their forward ends to the rear end of the tongue 27.

An auxiliary pilot wheel 98 having a rim similar to that of each covering wheel 18 and 19 is located ahead of each of said covering wheels and operates to smooth the surface of the ground in front of said wheels. Each pilot wheel 98 has its shaft supported by means of a crank arm 99 from a cross arm 100, which is journaled on the side frame members 11 and 12 at points 101. The shaft of each pilot wheel 98 also has secured thereto a link 102 whose upper end is pivoted to the lever arm 103 of a cross bar 104 which is journaled in the side frame members at the points 105. The cross bar 104 has fixed thereon an arm 105ª whose upper end is pivoted to an operating link 106. The other end of said link 106 is pivoted to an operating lever 107, pivoted on the shaft 88, which has a spring actuated tooth adapted to be operated by a hand latch 108 to engage the notches in the fixed notched quadrant 109. It is apparent that said lever 107 may be operated to raise or lower said pilot wheels 98 out of or into engagement with the surface of the ground ahead of said covering wheels 18 and 19. The seat 109ª is supported on brackets from the sleeve 76 and the rear cross frame 14 in such a position that the operator can conveniently reach all the levers above described.

The operation of my corn planter is as follows: Beginning at the end of the field the operator manipulates the lever 89 to release the tooth 91 and permit the clutch sleeves 82 and 85 to slide into operative position under the influence of the spring 87. The wheel 19, as well as the wheel 18, is then non-rotatively fixed on the shaft 17 and the sprocket wheel 72 is held fixed on said shaft, so that the main shaft 17 and the covering and supporting wheels 18 and 19 are maintained in step with the marker wheel and its shaft through the agency of the sprocket chain 73. The operator also operates the lever 107 to lower the pilot or smoothing wheels 98 until they rest freely on the ground ahead of the wheels 18 and 19 and he further manipulates the levers 57 to adjust the furrow openers 52 for the desired depth of furrow. The operator then drives across the field, and, as previously described, the marker wheel 33 will mark the ground at each half revolution thereof by means of the depressions 34 in its rim and at the instant when each marking takes place the corn dropping mechanism will plant a hill of corn. When the operator reaches the other end of the field he manipulates the lever 107 to elevate the pilot wheels 98 out of engagement with the surface of the ground and he then manipulates the lever 89 or the foot lever 94 which has the following effect: As the operator draws the lever 89 toward him the notch 90 in the lower end thereof will engage the operating arm 80 of the clutch lever 74 pushing said arm in a forward direction and thereby withdrawing the clutch sleeves 82 and 85 into an inoperative position. At the same time the lever 94, which is rigidly connected to the lever 89, will elevate the arm 97 which is attached to the tongue 27 and will thereby elevate the forward end of the machine and cause the shaft 32 to drop in the slots 35 until it reaches the lower extremities thereof, thereby raising the marker wheel 33, the furrow openers 52, and the hopper housing 36 so that the marker wheel will no longer be in contact with the surface of the ground. The side frame members 11 and 12 are jointed at 110 to permit this movement of the arm 97, the effect of which is to raise the frame of the machine adjacent the pivotal points 110 and elevate all of the parts carried thereby, including the furrow openers, until they are free of contact with the surface of the ground. With adjustments thus made, the wheel 19 will be rotatable on the shaft 17 so that the wheels 18 and 19, which are the only parts resting on the ground, will be free to revolve at different speeds while the machine is being turned around. The operator then turns around at the end of the field and is ready to plant two more rows of corn parallel to the two rows just planted. The clutch mechanism on the shaft 17 still being in inoperative position the operator turns the pilot wheel 33 until one of the depressions 34 is in alinement with a mark made by one of said depressions while planting the next preceding two rows of corn. The lever 89 is then moved forwardly, thereby lowering the marker wheel into contact with the surface of the ground and simultaneously permitting the clutch sleeve 82 and 85 to pass into operative position so that the marker shaft 32 will then be operatively connected through the sprocket chain 73 and associated mechanism to the shaft 17 and the covering wheels 18 and 19, which wheels will then be non-rotatively fixed thereon. After lowering the pilot wheels 98 into contact with the surface of the ground by the operation of the lever 107, the operator drives back across the field in a line parallel to the rows of corn just planted and the marker wheel will operate to leave ridges on the surface of the ground in line with those made by the depressions 34 on a previous trip across the field.

It has heretofore been found in the use of machines embodying a marker wheel that said marker wheel occasionally encounters large lumps of dirt or other obstacles in its path which cause said wheel to slip or to traverse a greater distance than the covering and supporting wheels which were not slipping and which were not at that particular time encountering obstacles in their paths. This resulted in an error due to the fact that the marks made by the marker wheel were so far out of alinement with those made in previous journeys across the field, the result being that when the work was finished the corn would not lie in rows transversely of the field as well as longitudinally thereof. My invention has completely overcome this difficulty since by means of the sprocket wheels and sprocket chain, which operatively connect the marker wheel and the covering and supporting wheels, all danger of slipping of the marker wheel, or other causes of inaccuracy, are avoided. When the marker wheel encounters an obstacle in its path it is automatically checked up with the covering and supporting wheels which continue to rotate, so that no matter how many obstacles are encountered, no matter how slippery the surface, and no matter what the distance may be across the field, it will always be found that the ridges left by the depressions 34 in the marker wheel will be in alinement transversely of the field with those made by the marker wheel in previous journeys across the field.

It is apparent that the operating lever 89 operates to lower the marker wheel into engagement with the surface of the ground at the same instant that the clutch mechanism passes into operative position so that after the marker wheel has been adjusted at the end of the field the sprocket wheels and their associated mechanism immediately begin to operate to keep the covering and supporting wheels in step with the marker.

It is apparent that the use of the pilot or smoothing wheels 98 ahead of the supporting wheels largely increases the reliability of the machine in keeping the hills of corn in alinement transversely of the field, since they crush the lumps of earth and provide smooth surfaces for the supporting wheels to traverse. It is therefore improbable that the supporting wheels will encounter obstacles which will cause them to slip or travel a path of increased length. Even if this should happen after the pilot wheels have passed, there is slight chance that both supporting wheels would encounter an obstacle at the same instant, and therefore one wheel would automatically check up the other, since they are both fixed on the shaft when the machine is in operation.

I have found that the use of a depression in the marker wheel instead of a ridge thereon is much more satisfactory, since a ridge left on the surface of the ground by a depression in the wheel is much more readily distinguished than a depression in the ground left by a ridge on the surface of the wheel.

The use of my improved latch member in the hopper housing, which automatically operates to drop the corn simultaneously with the marking of the ground by the marker wheel is also much superior to former devices adapted to serve this purpose, since by this means the dropping of the corn takes place instantaneously, whereas in former types where the corn was dropped directly from the recess in the dropping disk a considerable time was required for the corn to fall and the kernels of corn intended to be planted in one hill were not all dropped in one spot.

It is obvious that since the furrow openers 52 are each adjusted by independent levers they may be regulated to adapt themselves to uneven or hilly surfaces so that the two furrows made simultaneously will always be of equal depth.

From the foregoing description it will be apparent that my invention is adapted to be used, not only with corn planters, but with various forms of drills and grain or seed planters and, while I have described in detail a particular form of my invention, I do not intend to be limited to this particular form and adaptation of my invention since it may be embodied in other structures of widely divergent form.

I claim:

1. In a corn planter, a main shaft, a supporting-wheel fixed on said shaft, a slotted frame, a second shaft pivotally mounted on said frame to oscillate in the slots thereof, a marking-wheel mounted on said second-named shaft, corn-droppers carried by said second shaft and controlling the discharge of corn from said hopper, and means operatively connecting said shafts to cause said wheels to traverse the surface of the ground in synchronism.

2. In a corn planter, a supporting wheel, a marking wheel having means thereon to mark the ground distinctively at intervals, means operatively connecting said wheels to maintain the linear distance between successive distinctive markings uniform at all times, and an auxiliary pilot wheel to smooth the surface of the ground ahead of said supporting wheel.

3. In a corn planter, a supporting wheel, a marking wheel having means thereon to mark the ground distinctively at intervals, means operatively connecting said wheels to maintain the linear distance between successive distinctive markings uniform at all times, an auxiliary pilot wheel to smooth the surface of the ground ahead of said supporting wheel, and means to move said auxiliary wheel into or out of contact with the surface of the ground.

4. In a corn planter, a main shaft, a supporting wheel non-rotatably mounted thereon, a second supporting wheel rotatably mounted thereon, a second parallel shaft, a marking wheel fixed on said last named shaft, and means controlled by a single operating means to cause said second-named supporting wheel to non-rotatably engage the main shaft and to operatively connect said shafts to rotate in synchronism.

5. In a corn planter, a shaft having a marking wheel fixed thereon, means on said marking wheel to mark the ground distinctively at fixed intervals in the path of said wheel, furrow openers located one at each end of said shaft, corn hoppers located adjacent said shaft above said furrow openers, means actuated by said shaft to drop the corn into the furrows made by the furrow openers simultaneously with the distinctive marking of the ground by said wheel, and means comprising resiliently connected parts to elevate said furrow openers independently of each other.

6. In a corn planter, a shaft having a marking wheel fixed thereon, means on said marking wheel to mark the ground distinctively at fixed intervals in the path of said wheel, furrow openers located one at each end of said shaft, corn hoppers located adjacent said shaft above the furrow openers, means actuated by said shaft to drop the corn into the furrows made by the furrow openers simultaneously with the distinctive markings of the ground by said wheel, means to elevate said marking wheel, and independent means to elevate the furrow openers.

7. In a corn planter, a main frame comprising a rear portion and a forward portion, said portions being operatively connected, a main shaft mounted in the rear portion of said frame, supporting wheels mounted on said main shaft, a marking wheel shaft mounted in vertically extending slots adjacent the forward extremity of said rear portion of the frame, a marking wheel fixed on said marking wheel shaft, and means to tilt said forward portion of said frame with respect to the rear portion thereof to raise the front end of the rear portion of said main frame and to elevate said marking wheel out of contact with the surface of the ground.

8. In a corn planter, a main frame comprising a rear portion and a forward portion, said portions being operatively connected, a main shaft mounted in the rear portion of said frame, supporting wheels mounted on said main shaft, a marking wheel shaft mounted in vertically extending slots adjacent the forward extremity of said rear portion of the frame, a marking wheel fixed on said marking wheel shaft between the sides of said frame, means to operatively connect said shafts to rotate in synchronism, and means to tilt said forward portion of said frame with respect to the rear portion thereof to elevate said marking wheel out of contact with the surface of the ground.

9. In a corn planter, a main frame, a marking wheel shaft mounted in slots in said main frame, a marking wheel fixed on said shaft, and a sub frame pivotally mounted on said main frame and having said marking wheel shaft journaled therein, whereby lateral tilting of said marking wheel shaft in the slots is prevented.

10. In a corn planter, a shaft, a supporting-wheel non-rotatably mounted thereon, a second supporting-wheel rotatably mounted thereon, a rotatably mounted marking-wheel, and means for causing said second-named supporting-wheel to non-rotatably engage said shaft and to operatively connect said shaft and marking-wheel to rotate in synchronism and simultaneously to lower said marking-wheel into contact with the ground.

11. In a corn planter, a shaft, supporting-wheels thereon, a rotatably mounted marking-wheel and means operating when in one position to permit the supporting-wheels to rotate independently of each other and of said marking-wheel and to cause said marking-wheel to be elevated above the surface of the ground, and when in another position to operatively connect together said supporting-wheels and said marking-wheel to rotate in synchronism and to cause said marking-wheel to be in engagement with the surface of the ground.

12. In a corn planter, a shaft, supporting-wheels thereon, a rotatably mounted marking-wheel, corn-dropping mechanism, a furrow opener operating in advance of said mechanism, and means operating when in one position to permit the supporting wheels to rotate independently of each other and of said marking-wheel and to cause said marking-wheel and furrow-opener to be elevated above the surface of the ground, and when in another position to operatively connect together said supporting-wheels and said marking-wheel to rotate in synchronism and to cause said marking-wheel and furrow opener to be in engagement with the surface of the ground.

13. In a corn planter, a shaft, supporting-wheels thereon, a rotatably mounted marking-wheel, corn-dropping mechanism comprising a rotary element rotatable with said marking-wheel, a furrow opener operating in advance of said corn-dropping mechanism, and means operating when in one position to permit the supporting wheels to rotate independently of each other and of said marking-wheel and to cause said marking-wheel and furrow opener to be elevated above the surface of the ground, and when in another position to operatively connect together said supporting-wheels and said marking-wheel to rotate in synchronism and to cause said marking-wheel and furrow opener to be in engagement with the surface of the ground.

In testimony whereof, I have subscribed my name.

COLONEL W. LANHAM.

Witnesses:
GEO. L. WILKINSON,
WILLIAM S. HARMAN.

Copies of this patent may be obtained for five cents each, by addressing the "Commissioner of Patents, Washington, D. C."